United States Patent [19]
Jaffe et al.

[11] Patent Number: 5,256,760
[45] Date of Patent: Oct. 26, 1993

[54] CONDENSATION COPOLYMERS WITH SEQUENCED MER STRUCTURE

[75] Inventors: Michael J. Jaffe, Maplewood; Marie Borzo, Basking Ridge; Edward C. Chenevey, North Plainfield; Eui W. Choe, Randolph; M. Ishaq Haider, Bernardsville; Subhash Makhija, Chatham, all of N.J.

[73] Assignee: Hoechst Celanese Corp., Somerville, N.J.

[21] Appl. No.: 884,965

[22] Filed: May 15, 1992

[51] Int. Cl.⁵ .................... C08G 63/00; C08G 63/02
[52] U.S. Cl. .................................. 528/183; 528/184; 528/190; 528/192; 528/194; 528/219
[58] Field of Search ............... 528/184, 183, 190, 192, 528/194, 219

[56] References Cited

U.S. PATENT DOCUMENTS 4,507,515 3/1985 Johnston et al. .................. 585/12
4,547,428 10/1985 Bekker et al. .................... 528/501

Primary Examiner—John Kight, III
Assistant Examiner—T. Mosley
Attorney, Agent, or Firm—Michael W. Ferrell

[57] ABSTRACT

A method of making controlled sequence condensation copolymers from mer systems capable of forming at least two unique recurring units is disclosed and claimed. Sequenced polyesters containing the residue of hydroxyacids are specifically exemplified.

20 Claims, 8 Drawing Sheets

CONDENSATION COPOLYMERS WITH SEQUENCED MER STRUCTURE

TECHNICAL FIELD

The present invention relates generally to condensation copolymers having a sequenced monomer microstructure and specifically includes a method of making such polymers by an iterative process of determining the effect of sequenced substructure on polymer properties and resequencing the polymer to achieve the desired properties.

CROSS REFERENCE TO RELATED APPLICATION

The subject matter of this case is related to that of an application entitled Copolymers Having A Controlled Sequence Structure Ser. No. 07/884,100 filed May 15, 1992.

BACKGROUND ART

In common polymerization methods monomers are combined in the reaction vessel and allowed to react at random. Unless there is only one way that the polymer can form, sequences of repeating monomeric units will form as polymerization proceeds and the copolymer will be random. Random sequences are expected whenever a polymer is formed from two different monomers that have the same functional group. An example of such a random copolymer is a copolyester made from two monomers which have a hydroxy and carboxyl functionality such as copolymers of hydroxy benzoic acid and hydroxy napthoic acid, or a copolyimide in which each monomer has an amine and a carboxyl functionality. Another example is where more than two different monomers are combined, e.g., when two diols and one diacid form a polyester.

Ordered sequences are ordinarily expected only in copolymers made from a single monomer, or from two monomers that have different functionalities, e.g., when a diol and a diacid form a polyester.

Controlled sequences are known to occur in biological processes where specific complex molecules act as templates or sequenced controllers, e.g., DNA or RNA control in the growth of proteins.

SUMMARY OF INVENTION

In accordance with the present invention, condensation polymers such as polyesters, polyamides, polyimides and the like are produced with a controlled, non-random microstructure. The same is achieved by way of selective condensation in a pre-determined sequence or heat-treatment above the melting point at suitable temperatures. Particularly preferred for use in accordance with the present invention is at least one diacid, hydroxy acid, diol or aminophenol having the moieties set forth below:

DIACID

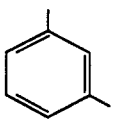

-continued

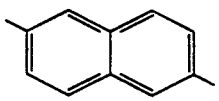

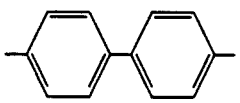

HYDROXYACID

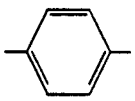

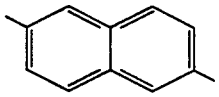

DIOL

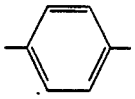

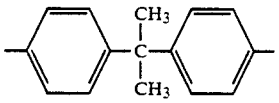

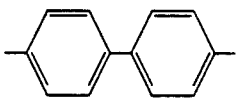

AMINOPHENOL

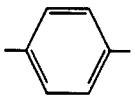

together with a comonomer from the same group or optionally another comonomer so long as the mer system forming the polymer is capable of at least two unique diads which are arranged in non-random manner. As used herein, "non-random", "sequenced" and like terms refer to polymers with sequenced monomer linkages in their backbones arranged in statistically non-random order, as opposed to the random sequences discussed below.

BRIEF DESCRIPTION OF DRAWINGS

The invention is described in detail in connection with the various figures in which.

DETAILED DESCRIPTION

Figure 1:
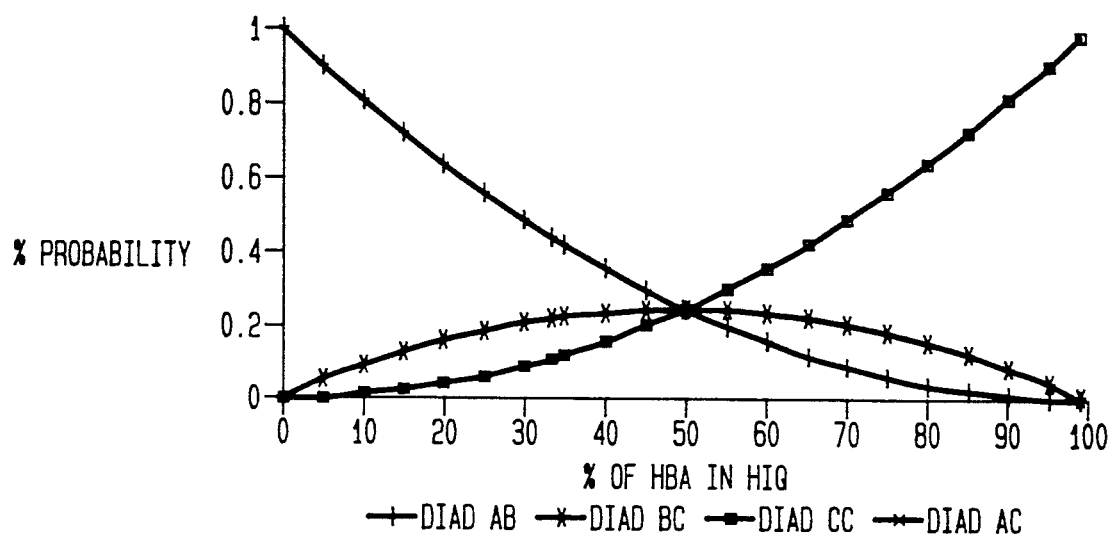
FIG. 1 is a graphical representation of the probability of various diad occurrences in HIQ polymer.

The invention is described with reference to numerous examples which are provided for purposes of illustration only. Various modifications are within the spirit and scope of the present invention which is defined by way of the annexed claims.

GENERAL CONSIDERATIONS

Generally speaking, the present invention is better understood by considering the probability aspects of random distribution in a polymer chain. Let $P(x)$ be the probability of occurrence of event x. Therefore $P(x1x2..xn)$ will be the number fraction of a particular sequence x1x2..xn taken n at a time. Thus $P(ABB)$ is the number fraction of ABB triads or the probability of occurrence of ABB, and so on. For a copolymer containing only A and B units we have $$P(A) + P(B) = 1$$

$$P(AA) + P(AB) + P(BA) + P(BB) = 1$$

The assumption of statistical stationaries leads to $$P(AB) = P(BA) \text{ etc.}$$

Similarly for triads we have $$P(ABB) + P(BBA) \text{ etc.}$$

However in our consideration of the polymerization process, the addition of a unit to a chain may depend on whether the end unit is A or B. Therefore we define $P(A/B)$ as the probability of adding A unit, given that the previous unit is B. Using Bayes theorem of probability we have $$P(AB) = P(A) P(B/A)$$

similarly, we have $$P(BAA) = P(B) P(A/B) P(A) \text{ and so on}$$

For condensation polymers one can assume Flory's principle of equal reactivity, i.e. an —OH group reacts with a —COOH group with the same reactivity, irrespective of the units to which these groups are attached. (This assumption is equivalent to Bernoullian or Markovian zero order statistics). This assumption leads to $$P(B/A) = P(B)$$

Therefore $$P(AB) = P(A) P(B)$$

This is a useful relationship and will be used for statistical analysis of various truly random copolymers. However, in general one can define a measure of departure from random statistics $$z = P(AB)/(P(A) P(B))$$

when $z = 1$ Random statistics
$z > 1$ more alternating tendency
$z < 1$ more blocky in nature
$z = 2$ completely alternating
$z = 0$ completely blocky The above relationship is general, and can be applied to any copolymer containing two units. The method to calculate $P(AB)$, $P(A)$ and $P(B)$ will depend upon the specific system. It can easily be shown that the average sequence length in terpolymers is shorter than in the corresponding copolymers. In other words a third monomer makes a substantial reduction in the longer sequences, making the possibility of crystallization less likely. By knowing the various reactivity ratios one can predict the sequence distribution for a completely random copolymer.

In the following analysis, A is isophathalic acid, B is hydroquinone and C is hydroxybenzoic acid (HBA). As will be readily understood by one of skill in the art there are only 10 possible triads in the copolymer which is generally referred to as "HIQ":

| ABA | BAC | ABC | BCC | BAB |
|-----|-----|-----|-----|-----|
| ACB | CAC | CBC | ACC | CCC | and 4 possible diads shown below.

AB BC AC CC

The triads ABC, BCC, ACB, ACC and BAC will have a double contribution since they are distinguishable read from left or right. On the other hand the triads ABA, BAB, CAC, CBC and CCC will not be doubled since they remain the same whether we read from left or right. In the case of diads, AB, BC, and AC will be doubled while CC will remain the same.

The second modification is made by taking into account the concentration effect. However, to understand the concept of probability calculations, first diad and triad calculations are shown for HIQ33 and HIQ40 and then extended to entire composition range of HIQ including tetrad calculations.

DIAD DISTRIBUTION IN HIQ33 POLYMER

The present invention is still better understood by considering a copolymer of isophthalic acid ("A"), hydroquinone ("B") and hydroxybenzoic acid ("C"); referred to hereinafter as HIQN where N is the mole % C.

Let us say that A reacts with the B with a probability of x. Then A will react with C with a probability of x/2., because C has only one —OH group compared to two groups in B. Similarly B will react with C with the probability of x/2. Also C will react with itself with a probability of x/2. Therefore the total probability of occurrence of AB will be 2x. (x for AB and x for BA). Similarly the total probability of AC (or BC) will be x. (x/2 for AC and x/2 for CA). The total probability of CC will be x/2.

Now the sum of all the probabilities of diads is equal to 1.

$$P(AB)+P(BC)+P(AC)+P(CC)=1$$

$$2x+x+x+x/2=1$$

$$x=2/9$$

Substituting this value back into probabilities of various diads we get the following values:

$$P(AB)\ 2x=44.44$$

$$P(BC)=x=22.22\%$$

$$P(AC)=x=22.22\%$$

$$P(CC)=x=11.11\%$$

TRIAD DISTRIBUTION IN HIQ33 POLYMER

Let us consider triads of ABC in HIQ33 polymer. The probability of diad AB is x. Now the probability that B of this diad will react with C is x/2. Therefore the probability of traid ABC is x. $x/2 = x^2/2$. Similarly the probability of triad CBA will be $x^2/2$. Therefore the total probability of ABC(CBA) is $x^2+x^2/2=x^2$. Similarly the following probabilities are calculated.

ABA x.x

ABC x.x/2+x.x/2=x.x

ACB* x/2.x+x/2.x=x.x

ACC x/2.x/2+x/2.x/2=x.x/2

BAB x.x

BAC x.x/2+x.2.x=x.x

BCC x/2.x/2+x/2.x/2=x.x/2

CAC x/2.x/2

CBC x/2.x/2

CCC x/2.x/2

* (Once C has reacted with A, the probability of it reacting with B becomes x and not x/2).

These probabilities are added and equated to 1, which gives $x^2=14.8148$. Thus

P(ABA)=14.8148%

P(ABC)=14.81%

P(ACB)=14.81%

P(ACC)=7.40%

P(BAB)=14.81%

P(BAC)=14.81%

P(BCC)=7.40%

P(CAC)=3.70%

P(CBC)=3.70%

P(CCC)=3.70%

DIAD DISTRIBUTION IN HIQn POLYMER

Where n denotes the mole percent of C in HIQ polymer. (for e.g., n=40, for HIQ40). Let us assume the composition of HIQn polymer as A:B:C::1:1:c where c=2n/(100-n), for e.g., for HIQ40, n=40, therefore c=2*40/(100-40)=1.333.

The above arguments can be easily extended to other compositions of HIQ keeping in mind that the probability of C reacting with A, B or C will be now multiplied by c to their respective probabilities. For example, the probability of BC is 1.cx/2+c.x/2=cx and the probability of cc is c.cx/2=c.c.x/2, So P(AB)=2x P(BC)=cx P(AC)=cx P(CC)=c.c.x/2

Adding above probabilities and equating to 1 we get, $$P(AB)+P(AC)+P(BC)+P(CC)=1$$

$$2x+cx+cx+c^2x/2=1$$

For various values of c the probability of different diads is shown in Table 1 and plotted in FIG. 1.

TABLE 1

DISTRIBUTION OF DIADS IN HIQ

| % HBA | c | Diad AB | Diad BC | Diad CC | % HBA | Diad AC |
|---|---|---|---|---|---|---|
| 0 | 0 | 1 | 0 | 0 | 0 | 0 |
| 5 | 0.105 | 0.903 | 0.047 | 0.002 | 5 | 0.047 |
| 10 | 0.222 | 0.81 | 0.09 | 0.01 | 10 | 0.09 |
| 15 | 0.353 | 0.723 | 0.128 | 0.023 | 15 | 0.128 |
| 20 | 0.5 | 0.64 | 0.16 | 0.04 | 20 | 0.16 |
| 25 | 0.666 | 0.563 | 0.187 | 0.062 | 25 | 0.187 |
| 30 | 0.857 | 0.49 | 0.21 | 0.09 | 30 | 0.21 |
| 33.33 | 1 | 0.444 | 0.222 | 0.111 | 33.33 | 0.222 |
| 35 | 1.077 | 0.423 | 0.227 | 0.122 | 35 | 0.227 |
| 40 | 1.333 | 0.36 | 0.24 | 0.16 | 40 | 0.24 |
| 45 | 1.636 | 0.303 | 0.247 | 0.202 | 45 | 0.247 |
| 50 | 2 | 0.25 | 0.25 | 0.25 | 50 | 0.25 |
| 55 | 2.444 | 0.203 | 0.248 | 0.302 | 55 | 0.248 |
| 60 | 3 | 0.16 | 0.24 | 0.36 | 60 | 0.24 |
| 65 | 3.714 | 0.122 | 0.227 | 0.423 | 65 | 0.227 |
| 70 | 4.667 | 0.09 | 0.21 | 0.49 | 70 | 0.21 |
| 75 | 6 | 0.063 | 0.188 | 0.563 | 75 | 0.188 |
| 80 | 8 | 0.04 | 0.16 | 0.64 | 80 | 0.16 |
| 85 | 11.333 | 0.023 | 0.128 | 0.722 | 85 | 0.128 |
| 90 | 18 | 0.01 | 0.09 | 0.81 | 90 | 0.09 |
| 95 | 38 | 0.003 | 0.048 | 0.903 | 95 | 0.048 |
| 99 | 198 | 1.00e-04 | 0.01 | 0.98 | 99 | 0.01 |

TRIAD DISTRIBUTION IN HIQn POLYMER

This will be similar to HIQ33 except whenever C is involved it is multiplied by c to account for concentration.

P(ABA)=x. x $P(ABC) = x. (cx/2) + c.(x/2).x = c.x.x$ $P(ACB) = (cx/2). x + (cx/2).x = c.x.x$ $P(ACC) = (cx/2).(cx/2) + c.(cx/2).(x/2) = c.c.x.x/2$ $P(BAB) = x. x$ $P(BAC) = x. cx/2 + c. (x/2).x = c.x.x$ $P(BCC) = cx/2. (cx/2) + c. (cx/)2. (x/2) = c.c.x.x/2$ $P(CAC) = c. (x/2). (cx/2) = c.c.x.x/4$ $P(CBC) = c. (x/2). (cx/2) = c.c.x.x/4$ $P(CCC) = c. (cx/2).(cx/2) = c.c.c.x.x/4$

Figure 2:
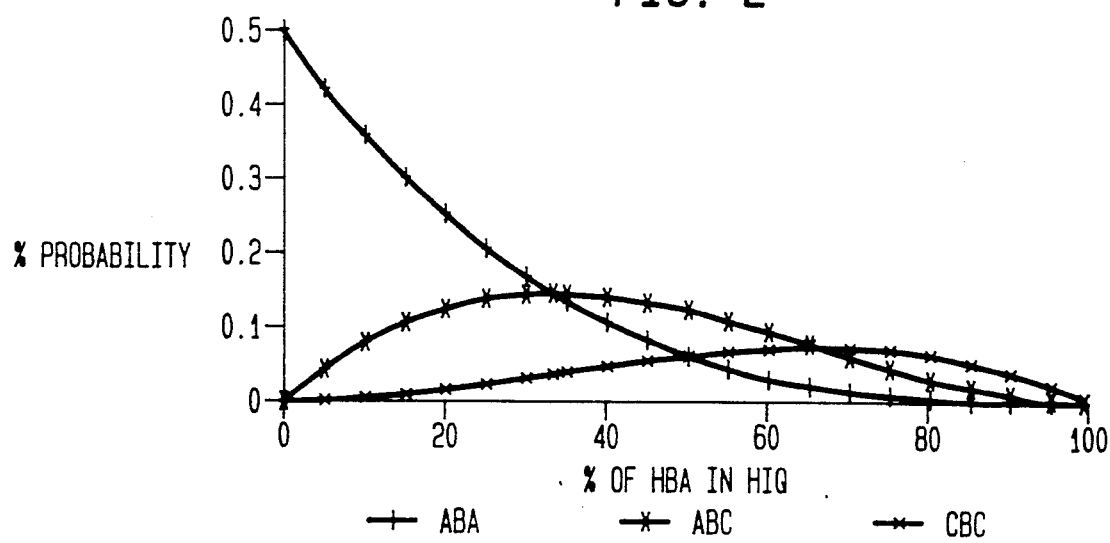
FIG. 2 is a graphical representation of the statistical distribution of hydroquinone-centered triads in HIQ polymer.
Figure 3:
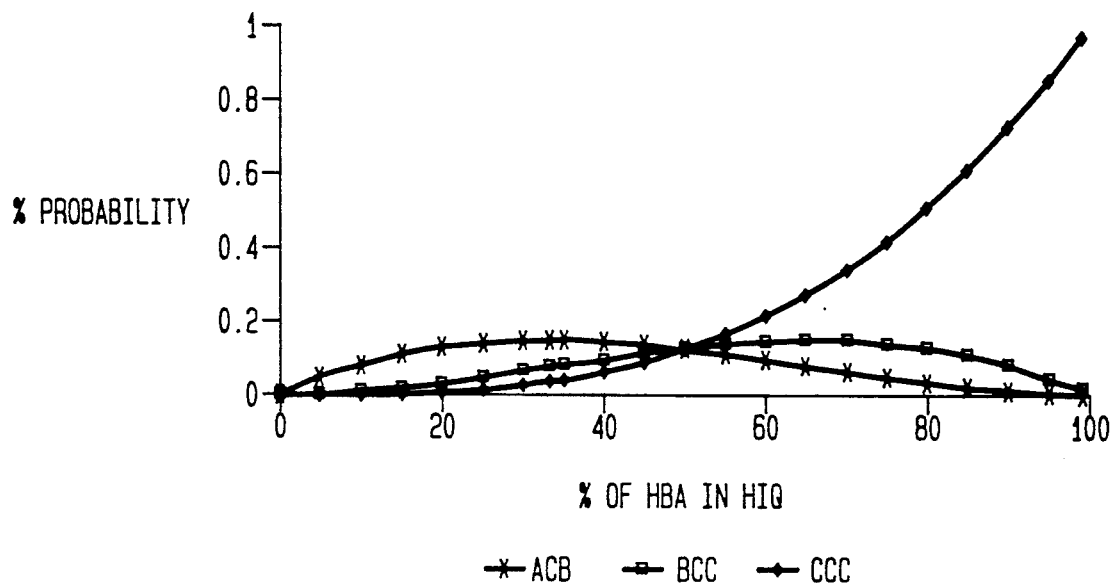
FIG. 3 is a graphical representation of the statistical distribution of hydroxybenzoic acid-centered triads in HIQ polymer.

All of the above probabilities are equated to 1 for various values of c the probabilities of different HIQ compositions are shown in Table 2. These values for A centered and C centered triads are shown in FIGS. 2 and 3.

TABLE 2

DISTRIBUTION OF TRIADS IN HIQ

| Row | % HBA | C-HBA | ABA | ACB | BCC | CBC | CCC |
|---|---|---|---|---|---|---|---|
| 1 | 0.00 | 0.000 | 0.500000 | 0.000000 | 0.000000 | 0.0000000 | 0.0000000 |
| 2 | 5.00 | 0.105 | 0.428848 | 0.045029 | 0.002364 | 0.0011820 | 0.000124 |
| 3 | 10.00 | 0.222 | 0.364511 | 0.080994 | 0.008998 | 0.0044992 | 0.001000 |
| 4 | 15.00 | 0.353 | 0.307063 | 0.080994 | 0.008998 | 0.0044992 | 0.001000 |
| 5 | 20.00 | 0.500 | 0.256000 | 0.108375 | 0.019125 | 0.0095625 | 0.003375 |
| 6 | 25.00 | 0.667 | 0.210937 | 0.140625 | 0.046875 | 0.0234376 | 0.015625 |
| 7 | 30.00 | 0.875 | 0.171501 | 0.147000 | 0.063000 | 0.0314999 | 0.027000 |
| 8 | 33.00 | 1.000 | 0.148148 | 0.148148 | 0.074074 | 0.0370370 | 0.0387037 |
| 9 | 35.00 | 1.077 | 0.137316 | 0.147875 | 0.079623 | 0.0398117 | 0.042873 |
| 10 | 40.00 | 1.333 | 0.108000 | 0.144000 | 0.096000 | 0.0480000 | 0.064000 |
| 11 | 45.00 | 1.636 | 0.083212 | 0.136136 | 0.111359 | 0.0556795 | 0.091092 |
| 12 | 50.00 | 2.000 | 0.062500 | 0.125000 | 0.125000 | 0.0625000 | 0.125000 |
| 13 | 55.00 | 2.444 | 0.045576 | 0.111388 | 0.136116 | 0.0680582 | 0.166334 |
| 14 | 60.00 | 3.000 | 0.032000 | 0.096000 | 0.144000 | 0.072000 | 0.216000 |
| 15 | 65.00 | 3.714 | 0.021438 | 0.079625 | 0.147875 | 0.0739375 | 0.274625 |
| 16 | 70.00 | 4.667 | 0.013500 | 0.063000 | 0.147000 | 0.0734999 | 0.343002 |
| 17 | 75.00 | 6.000 | 0.007813 | 0.046875 | 0.140625 | 0.0703125 | 0.421875 |
| 18 | 80.00 | 8.000 | 0.004000 | 0.032000 | 0.128000 | 0.0640000 | 0.512000 |
| 19 | 85.00 | 11.333 | 0.001687 | 0.019125 | 0.108375 | 0.0541875 | 0.614125 |
| 20 | 90.00 | 18.000 | 0.000500 | 0.009000 | 0.081000 | 0.0405000 | 0.729000 |
| 21 | 95.00 | 38.000 | 0.000063 | 0.002375 | 0.045125 | 0.0225625 | 0.857375 |
| 22 | 99.0 | 198.000 | 0.000000 | 0.000099 | 0.009801 | 0.0049005 | 0.970299 |

TETRAD DISTRIBUTION IN HIQn POLYMER

The above arguments can be extended to tetrad calculations in HIQn copolymer. There are 16 possible tetrads. These are shown below along with their probabilities.

$P(ABAB) = 2.x^3$ $P(ABCA) = x_c x^3$ $P(ABAC) = x_c x^3$ $P(ABCC) = x_c x^3/2$ $P(ACBC) = x_c x^3/2$ $P(ACCB) = x_c x^3/2$ $P(ACCC) = x_{c2} x^3/4$ $P(BABC) = x_c.x^3$ $P(BACB) = x_c.x^3$ $P(BCCC) = x_{c3} x^3/4$ $P(CACB) = x_{c2} x^3/2$ $P(CACC) = x_{c3} x^3/4$ $P(CBCC) = x_{c3} x^3/4$ $P(CCCC) = x_c^4 x^3/8$ $P(CBAC) = x_c^2 x^3/2$ $P(BACC) = x_c^2 x^3/2$

Figure 4:
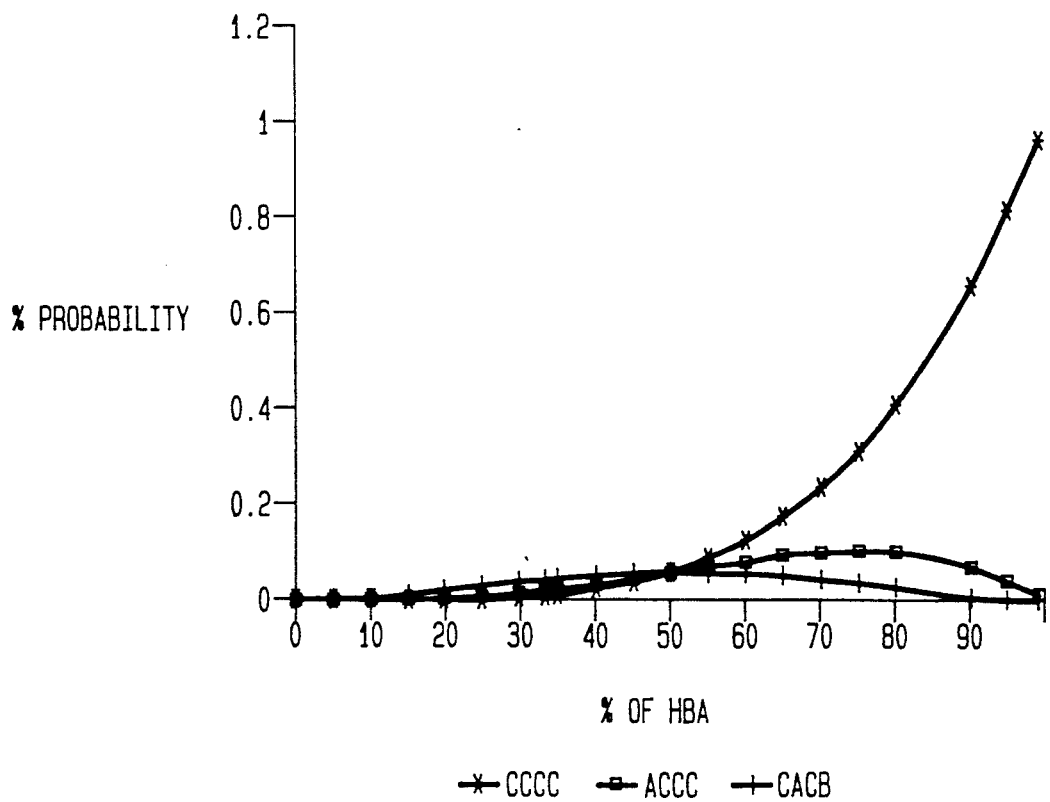
FIGS. 4 and 5 are graphical representations of the probability of various tetrads in HIQ polymer.
Figure 5:
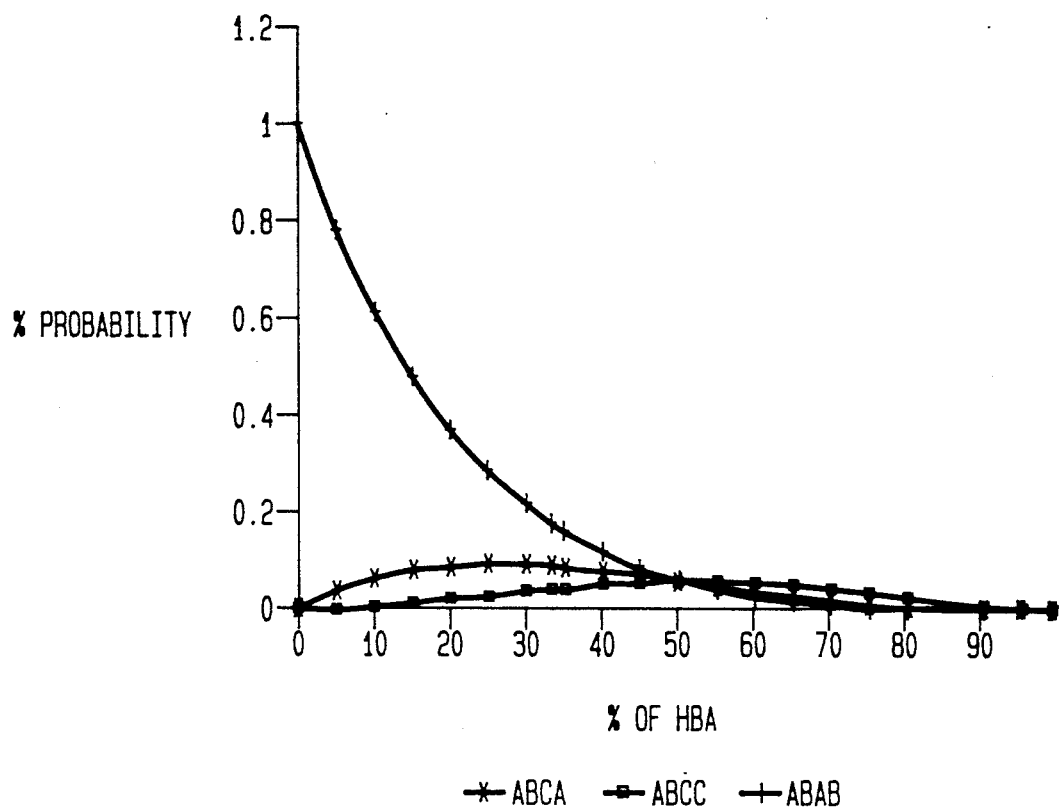
Figure 6:
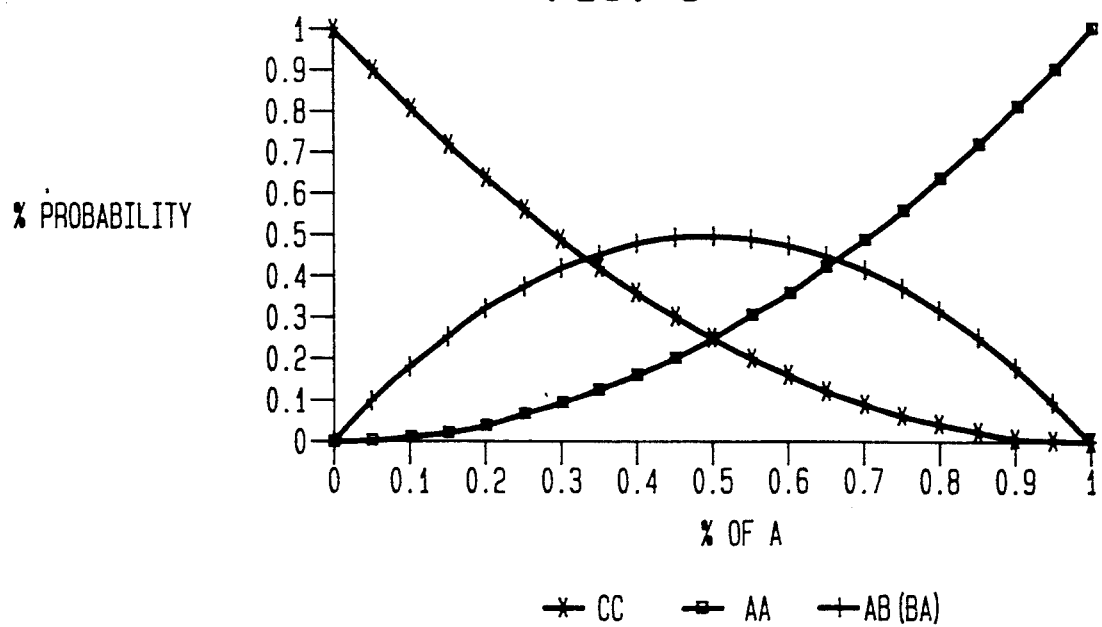
FIGS. 6-9 are graphical representations of various diads, triads and tetrads in HNA/HBA copolyester.
Figure 7:
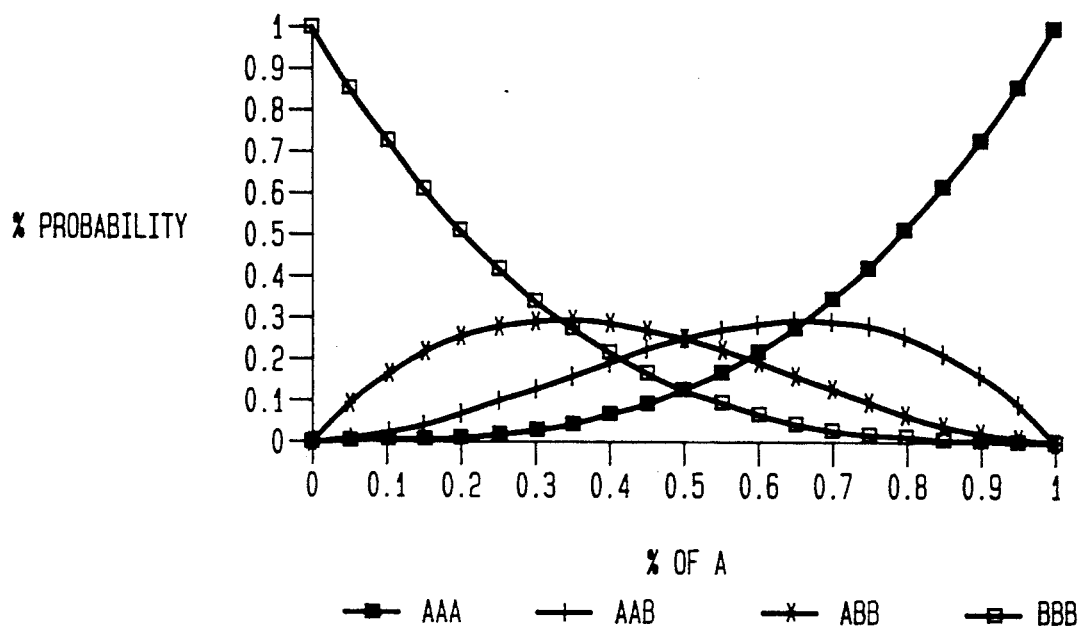
Figure 8:
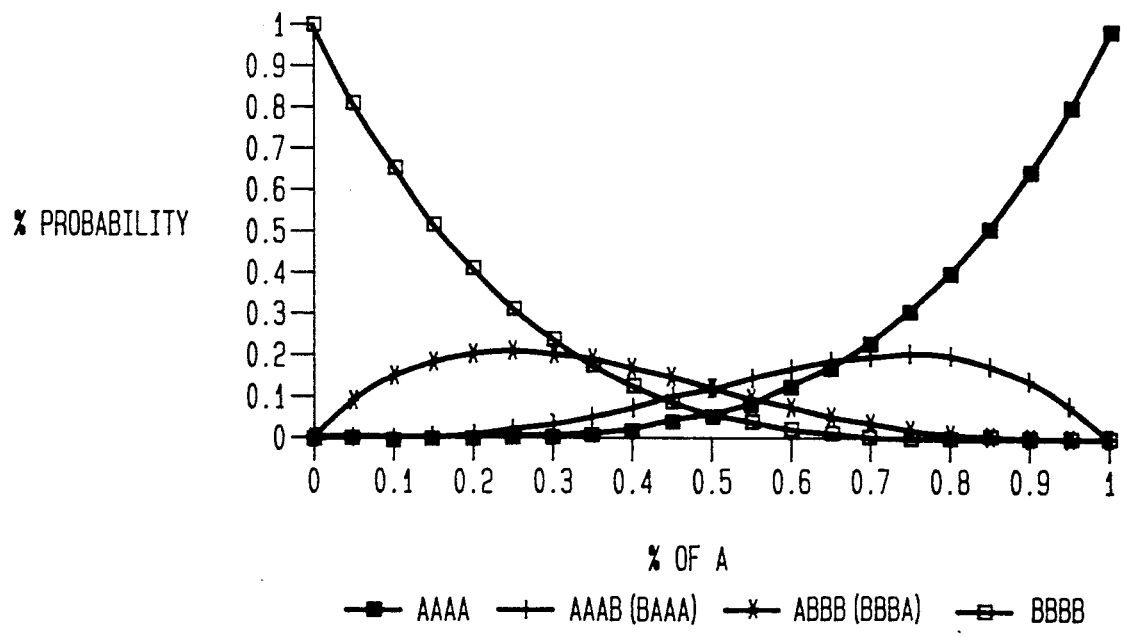
Figure 9:
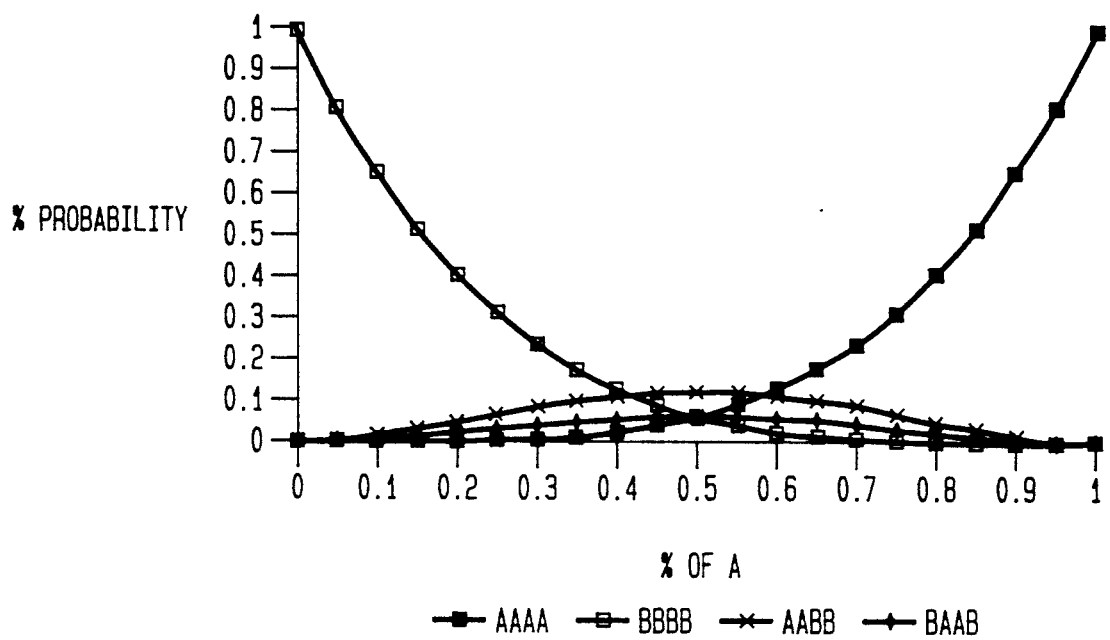

Adding all above probabilities and equating to 1, we get the distribution of various tetrads. These are listed in Tables 3 and 4 and plotted in FIGS. 4 and 5.

TABLE 3

DISTRIBUTION OF TETRADS IN HIQ

| % of HBA | ACCC | CACB | CCCC |
|---|---|---|---|
| 0 | 0 | 0 | 0 |
| 5 | 0.000113 | 0.002154 | 6E-06 |
| 10 | 0.00837 | 0.0075379 | 0.0 |
| 15 | 0.002627 | 0.014885 | 0.000464 |
| 20 | 0.005806 | 0.0232221 | 0.001451 |
| 25 | 0.010599 | 0.0317989 | 0.003533 |
| 30 | 0.017137 | 0.0399854 | 0.007344 |
| 33.33 | 0.022472 | 0.0449438 | 0.011236 |
| 35 | 0.025424 | 0.0472171 | 0.01369 |
| 40 | 0.035346 | 0.0530193 | 0.023564 |
| 45 | 0.046615 | 0.0569863 | 0.038131 |
| 50 | 0.058824 | 0.0588235 | 0.058824 |
| 55 | 0.071284 | 0.0583342 | 0.08711 |
| 60 | 0.083205 | 0.05547 | 0.124807 |
| 65 | 0.093513 | 0.050353 | 0.173666 |
| 70 | 0.100991 | 0.0432817 | 0.235648 |
| 75 | 0.104247 | 0.034749 | 0.312741 |
| 80 | 0.101749 | 0.0254372 | 0.406995 |
| 90 | 0.072834 | 0.0080927 | 0.65551 |
| 95 | 0.042864 | 0.002256 | 0.814409 |
| 99 | 0.009703 | 0.0 | 0.960595 |

TABLE 4

DISTRIBUTION OF TETRADS IN RANDOM HIQ

| % of HBA | ABAB | ABCA | ABCC |
|---|---|---|---|
| 0 | 0.5 | 1 | 0 | 0 |
| 5 | 0.39074 | 0.78148 | 0.0410277 | 0.002154 |
| 10 | 0.305895 | 0.61179 | 0.679087 | 0.0075379 |
| 15 | 0.238988 | 0.47798 | 0.0843486 | 0.014885 |

TABLE 4-continued

| DISTRIBUTION OF TETRADS IN RANDOM HIQ | | | |
|---|---|---|---|
| % of HBA | ABAB | ABCA | ABCC |
| 20 | 0.185776 | 0.37155 | 0.0928882 | 0.0232221 |
| 25 | 0.143124 | 0.028625 | 0.0954064 | 0.0317989 |
| 30 | 0.10885 | 0.2177 | 0.0932995 | 0.0399854 |
| 33.33 | 0.089888 | 0.17978 | 0.0898876 | 0.0449438 |
| 35 | 0.081429 | 0.16286 | 0.0876908 | 0.0472171 |
| 40 | 0.059646 | 0.11929 | 0.0795285 | 0.0530193 |
| 45 | 0.042583 | 0.08517 | 0.0696654 | 0.0569863 |
| 50 | 0.029412 | 0.05882 | 0.0588235 | 0.0588235 |
| 55 | 0.019532 | 0.03906 | 0.0477367 | 0.0583342 |
| 60 | 0.012327 | 0.02465 | 0.03698 | 0.05547 |
| 65 | 0.0073 | 0.0146 | 0.0271132 | 0.050353 |
| 70 | 0.003975 | 0.00795 | 0.0185492 | 0.0432817 |
| 75 | 0.001931 | 0.00386 | 0.011583 | 0.034749 |
| 80 | 0.000795 | 0.00159 | 0.0063593 | 0.0254372 |
| 90 | 0 | 0.0001 | 0.0008992 | 0.0080927 |
| 95 | 3E-06 | 0 | 0.0001187 | 0.002256 |
| 99 | 0 | 0 | 1E-06 | 0.0 |

SEQUENCE DISTRIBUTION IN RANDOM HBA/HNA COPOLYMER

Consider next a copolyester of hydroxybenzoic acid ("HBA") and 2,6-hydroxy naphthoic acid ("HNA"). From the nomenclature of FIG. 1 we have C1 and C2 monomers. Both C1 and C2 can react with themselves and with each other. Therefore treatment of diad and triad distribution is relatively simple in HBA/HNA copolymer compared to HIQ.

There are four possible diads in Vectra. These are:

C1C1  C1C2  C2C1  C2C2 and there are six triads. These are

C1C1C1  C1C1C2  C1C2C1  C1C2C2  C2C1C2  C2C2C2 and there are 10 tetrads.

C1C1C1C1  C1C1C1C2  C1C2C1C1  C1C2C1C2  C1C2C2C1
C1C2C2C2  C2C1C2C2  C2C2C2C2  C2C1C1C2  C1C1C2C2

Let Y be the mole fraction of HBA in the copolymer, then 1-y will be the composition of HNA. Let x be the probability that C1 will react with C1 or C2. Following similar arguments as in the case of HIQ and assuming equal reactivity, we have:

Probability of diad C1C1 $y \cdot xy$

Probability of diad C1C2 $y \cdot x (1-y)+(1-y)x$
$y = 2xy(1-y)$

Probability of diad C2C2 $(1-y)(1-y)x$ adding above and equating to 1 gives $x(y^2 + y(1-y) + (1-y)^2) = 1$ similarly probabilities for the 12 triads are calculated and equated to 1. This gives $x^3 (y^3 + 3y^2(1-y) + 3 y (1-y)^2 + (1-y)^4) = 1$ For ten tetrads the equations are $x^4 (y^4 + 4y^3(1-y) + 4 y (1-y)^3 + 5y^2 (1-y)^2 + (1-y)^4) = 1$ The solution to these equations for various values of y are given in Tables 5–7 and plotted in FIGS. 6–9.

TABLE 5

| DISTRIBUTION OF DIADS IN CO | | | |
|---|---|---|---|
| % of A | AA | AB(BA) | CC |
| 0 | 0 | 0 | 1 |
| 0.05 | 0.0025 | 0.095 | 0.9025 |
| 0.1 | 0.01 | 0.18 | 0.81 |
| 0.15 | 0.0225 | 0.225 | 0.7225 |
| 0.2 | 0.04 | 0.32 | 0.64 |
| 0.25 | 0.0625 | 0.375 | 0.5625 |
| 0.3 | 0.9 | 0.42 | 0.49 |
| 0.35 | 0.1225 | 0.455 | 0.4225 |
| 0.4 | 0.16 | 0.48 | 0.36 |
| 0.45 | 0.2025 | 0.495 | 0.3025 |
| 0.5 | 0.25 | 0.5 | 0.25 |
| 0.55 | 0.302525 | 0.495 | 0.2025 |
| 0.6 | 0.36 | 0.48 | 0.16 |
| 0.65 | 0.4225 | 0.455 | 0.1225 |
| 0.7 | 0.49 | 0.42 | 0.09 |
| 0.75 | 0.5625 | 0.375 | 0.625 |
| 0.8 | 0.64 | 0.32 | 0.04 |
| 0.85 | 0.7225 | 0.255 | 0.0225 |
| 0.9 | 0.81 | 0.18 | 0.01 |
| 0.95 | 0.9025 | 0.095 | 0.0025 |
| 1 | 1 | 0 | 0 |

A is % of HBA, B is % of HNA

TABLE 6

| PROBABILITY OF TRIAD DISTRIBUTION IN CO | | | | |
|---|---|---|---|---|
| % of A | AAA | AAB | ABB | BBB |
| 0 | 0 | 0 | 0 | 1 |
| 0.05 | 0.000125 | 0.00475 | 0.09025 | 0.857375 |
| 0.1 | 0.001 | 0.018 | 0.162 | 0.729 |
| 0.15 | 0.003375 | 0.03825 | 0.21675 | 0.614125 |
| 0.2 | 0.008 | 0.064 | 0.256 | 0.512 |
| 0.25 | 0.015625 | 0.9375 | 0.28125 | 0.421875 |
| 0.3 | 0.027 | 0.126 | 0.294 | 0.343 |
| 0.35 | 0.042875 | 0.15925 | 0.29575 | 0.274625 |
| 0.4 | 0.064 | 0.192 | 0.288 | 0.216 |
| 0.45 | 0.091125 | 0.22275 | 0.27225 | 0.166375 |
| 0.5 | 0.125 | 0.25 | 0.25 | 0.125 |
| 0.55 | 0.166375 | 0.27225 | 0.22275 | 0.091125 |
| 0.6 | 0.216 | 0.288 | 0.192 | 0.064 |
| 0.65 | 0.274625 | 0.29575 | 0.15925 | 0.042875 |
| 0.7 | 0.343 | 0.294 | 0.126 | 0.027 |
| 0.75 | 0.421875 | 0.28125 | 0.9375 | 0.015625 |
| 0.8 | 0.512 | 0.256 | 0.064 | 0.008 |
| 0.85 | 0.614125 | 0.21675 | 0.03825 | 0.003375 |
| 0.9 | 0.729 | 0.162 | 0.018 | 0.001 |
| 0.95 | 0.857375 | 0.09025 | 0.00475 | 0.000125 |
| 1 | 1 | 0 | 0 | 0 |

TABLE 7

| DISTRIBUTION OF TETRADS IN CO | | | | | | |
|---|---|---|---|---|---|---|
| % of A | AAA | AAAB | ABBB | BBBB | AABB | BAAB |
| 0 | 0 | 0 | 0 | 1 | 0 | 0 |
| 0.05 | 6.25E-06 | 0.0002375 | 0.0857375 | 0.8145062 | 0.0045125 | 0.00225625 |
| 0.1 | 0.0001 | 0.0018 | 0.1458 | 0.6561 | 0.0162 | 0.0081 |
| 0.15 | 0.00050625 | 0.0057375 | 0.1842375 | 0.5220063 | 0.0325125 | 0.01625625 |
| 0.2 | 0.0016 | 0.0128 | 0.0248 | 0.0496 | 0.0512 | 0.0256 |
| 0.25 | 0.00390625 | 0.0234375 | 0.2109375 | 0.3164063 | 0.0703125 | 0.03515625 |
| 0.3 | 0.0081 | 0.0378 | 0.0258 | 0.2401 | 0.0882 | 0.0441 |
| 0.35 | 0.01500625 | 0.0557375 | 0.1922375 | 0.1785063 | 0.1035125 | 0.05175625 |

TABLE 7-continued

| | DISTRIBUTION OF TETRADS IN CO | | | | | |
|---|---|---|---|---|---|---|
| % of A | AAAA | AAAB | ABBB | BBBB | AABB | BAAB |
| 0.4 | 0.0256 | 0.0768 | 0.1728 | 0.1296 | 0.1152 | 0.0576 |
| 0.45 | 0.04100625 | 0.1002375 | 0.1497375 | 0.09150625 | 0.1225125 | 0.06125625 |
| 0.5 | 0.625 | 0.125 | 0.125 | 0.625 | 0.125 | 0.625 |
| 0.55 | 0.09150625 | 0.1497375 | 0.1002375 | 0.04100625 | 0.1225125 | 0.06125625 |
| 0.6 | 0.1296 | 0.1728 | 0.0768 | 0.256 | 0.1152 | 0.0576 |
| 0.75 | 0.1785063 | 0.1922375 | 0.0557375 | 0.01500625 | 0.1035125 | 0.05175625 |
| 0.7 | 0.2401 | 0.2058 | 0.0378 | 0.0081 | 0.0882 | 0.0441 |
| 0.75 | 0.3164063 | 0.2109375 | 0.0234375 | 0.00390625 | 0.0703125 | 0.03515625 |
| 0.8 | 0.4096 | 0.2048 | 0.0128 | 0.0016 | 0.0512 | 0.0256 |
| 0.85 | 0.5220063 | 0.1842375 | 0.0057375 | 0.00050625 | 0.0325125 | 0.01625625 |
| 0.9 | 0.6561 | 0.1458 | 0.0018 | 0.0001 | 0.0162 | 0.0081 |
| 0.95 | 0.8145062 | 0.857375 | 0.002375 | 6.25E-06 | 0.0045125 | 0.00225625 |
| 1 | 1 | 0 | 0 | 0 | 0 | 0 |

SEQUENCE DISTRIBUTION IN HBA/HNA/TA/HQ COPOLYMERS

Consider next a copolyester of HBA, HNA, TA, and HQ. This belongs to a class of A, B and C1 and C2 type of polymer. In this case we have 8 possible diads. These are

| AB | AC1 | AC2 | BC1 |
|---|---|---|---|
| BC2 | C1C1 | C1C2 | C2C2 | and there are 37 triads.

| ABA | ABC1 | ABC2 | AC1B | AC1C1 |
|---|---|---|---|---|
| AC1C2 | AC2B | AC2C1 | AC2C2 | BC1A |
| BC1C1 | BC1C2 | BC2A | BC2C1 | BC2C2 |
| C1C1A | C1C1B | C1C1C1 | C1C1C2 | C1C2A |
| C1C2B | C1C2C1 | C1C2C2 | C2C2A | C2C2B |
| C2C2C1 | C2C2C2 | BAB | B1AC1 | BAC2 |
| C1AC1 | C1AC2 | C2AC2 | C1BC1 | C1BC2 |
| C2BC2 | C2C1C2 | | | |

Following an analysis similar to HIQ and HBA/HNA copolymers described above, one can obtain equations describing diads, triads and tetrads. Obviously, we have two variables for concentration here. The concentration of A and B will always be equal while the concentration of C1 and C2 can vary independently. Therefore we have a large number of possible sequences depending upon the concentration of C1 and C2. For simplicity we demonstrate the diad probabilities for equal concentration of A, B, C and i.e., $[A]=[B]=[C]=[D]=0.25$. For this case we have:

$$P(AB)+P(AC)+P(AD)+P(BC)+P(BD)+P(CC)+P(CD)+P(DD)=1$$

$$2x+x+x+x+x+x/2+x+x/2=1$$

$$x=\tfrac{1}{8}$$

Therefore $P(AB)=\tfrac{1}{8}$ $P(AC)=\tfrac{1}{8}$ $P(AD)=\tfrac{1}{8}$ $P(BC)=\tfrac{1}{8}$ $P(BD)=\tfrac{1}{8}$ $P(CC)=1/16$ $P(CD)=\tfrac{1}{8}$ $P(DD)=1/16$ Similarly for triads we have ABA $x.x$ ABC $x.x/2 + x.x/2 = x.x$ ABD $x.x$ ACB* $x/2.x + x/2.x = x.x$ ACC $x/2.x/2 + x/2.x/2 = x.x/2$ ACD $x.x/2$ ADB $x.x$ ADC $x.x/2$ ADD $x.x/2$ BCA $x.x$ BCC $x/2.x/2 + x/2.x/2 = x.x/2$ BCD $x.x/2$ BDA $x.x$ BDC $x.x/2$ BDD $x.x/2$ CCA $x.x/2$ CCB $x.x/2$ CCC $x/2.x/2$ CCD $x.x/2$ CDA $x.x$ CDB $x.x/2$ CDC $x/2.x/2$ CDD $x/2.x$ DDA $x/2.x$ DDB $x.x/2$ DDC x.x/2

DDD x/2.x/2

BAB x.x

BAC x.x

BAD x.x

CAC x/2.x/2

CAD x/2.x/2

DAD x/2.x/2

CBC x/2.x/2

CBD x.x/2

DBD x/2.x/2

DCD x/2.x/2

In the above analysis D is same as C2. These probabilities can be added and equated to 1 to calculate the concentration of various triads. By following similar arguments the analysis can be extended to tetrads.

EFFECT OF SEQUENCE ON END TO END DISTANCE

Figure 10:
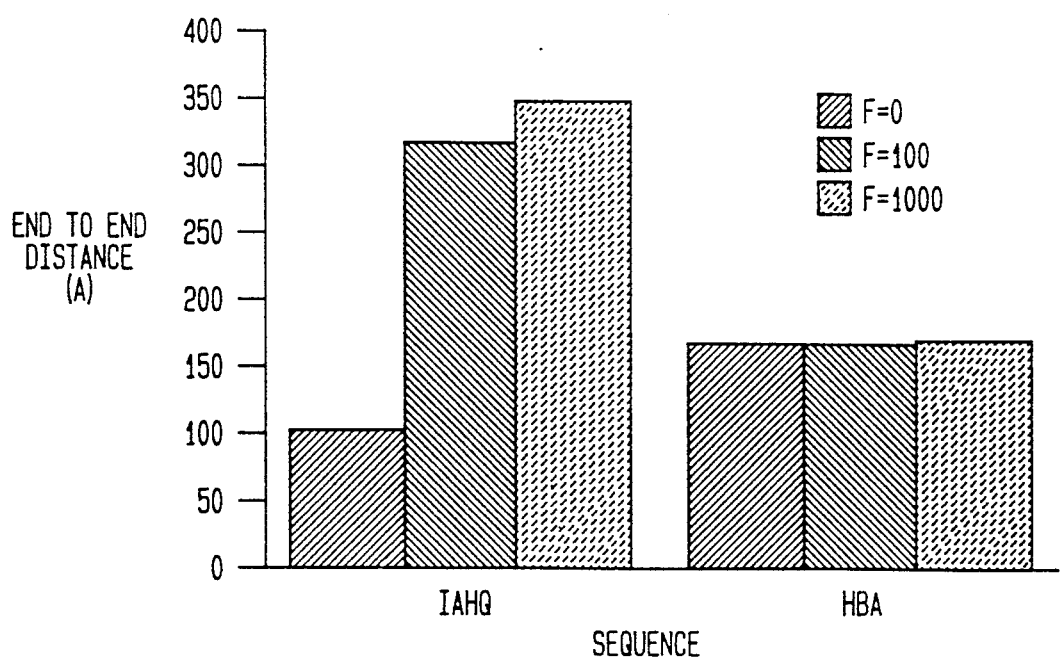
FIGS. 10 and 11 are graphical representations of calculated polymer properties.
Figure 11:
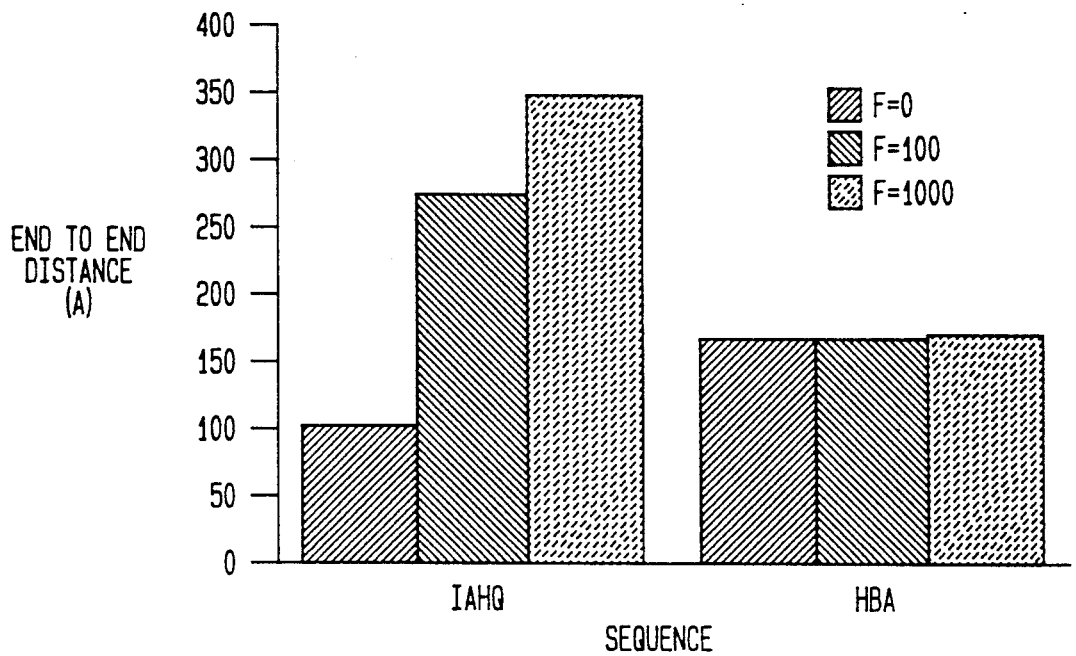

End to end distance for Poly HBA (HIQ100) and poly IAHQ (HIQ 0) are shown in FIGS. 10 and 11. An interesting observation from FIGS. 10 and 11 is that with increase in force, the end to end distance for poly HBA remains same while that of IAHQ increases, indicating that single chain of poly HBA is rigid rod while that of IAHQ is not. This result is expected since IAHQ is meta linked compared with HBA which is para linked. Further with increase in temperature there is a slight decrease in end to end distance.

These calculations (shown in FIGS. 10 and 11) were based on Monte Carlo Rotational Isomeric State Theory (RIS) using a commercial software called CERIUS available from Cambridge Software, (G.B.) where F is the force applied on the single chain of polymer.

Meridional Scattering of HIQ40 Single Chain

Figure 12:
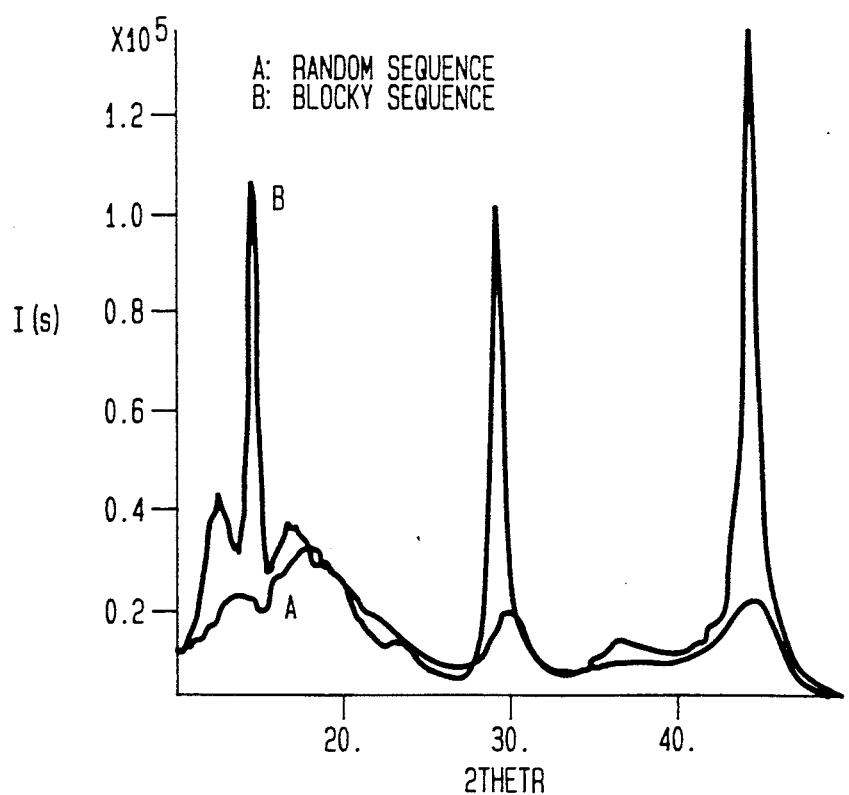
FIGS. 12 and 13 illustrate meridional scattering for various sequenced polymers.
Figure 13:
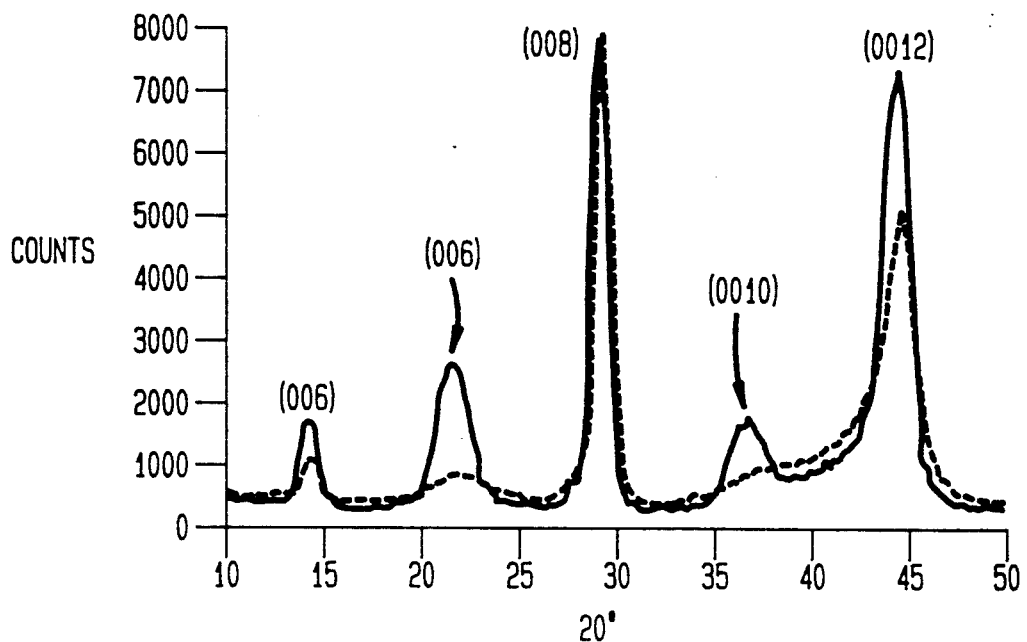

Meridional scattering of HIQ40 single chain with different sequences is shown in FIG. 12. As can be seen from the FIG. 12 changes in sequences give rise to different meridional scattering patterns. Meridional scattering is the scattering in the direction of the chains i.e. z component of the X-ray scattering. In the blocky sequence there are more peaks and peaks are sharp. This indicates that meridional scattering of the HIQ40 fiber with different sequences will be different. Scattering patterns for HIQ35 fibers are shown in FIG. 13. The simulated HIQ40 meridional scattering matches well with the experimental data. Further it can be noticed that heat treated fiber has a peak around 37° which is not there in as spun fiber.

X-ray Scattering of HIQ40 Single Chain

Figure 14:
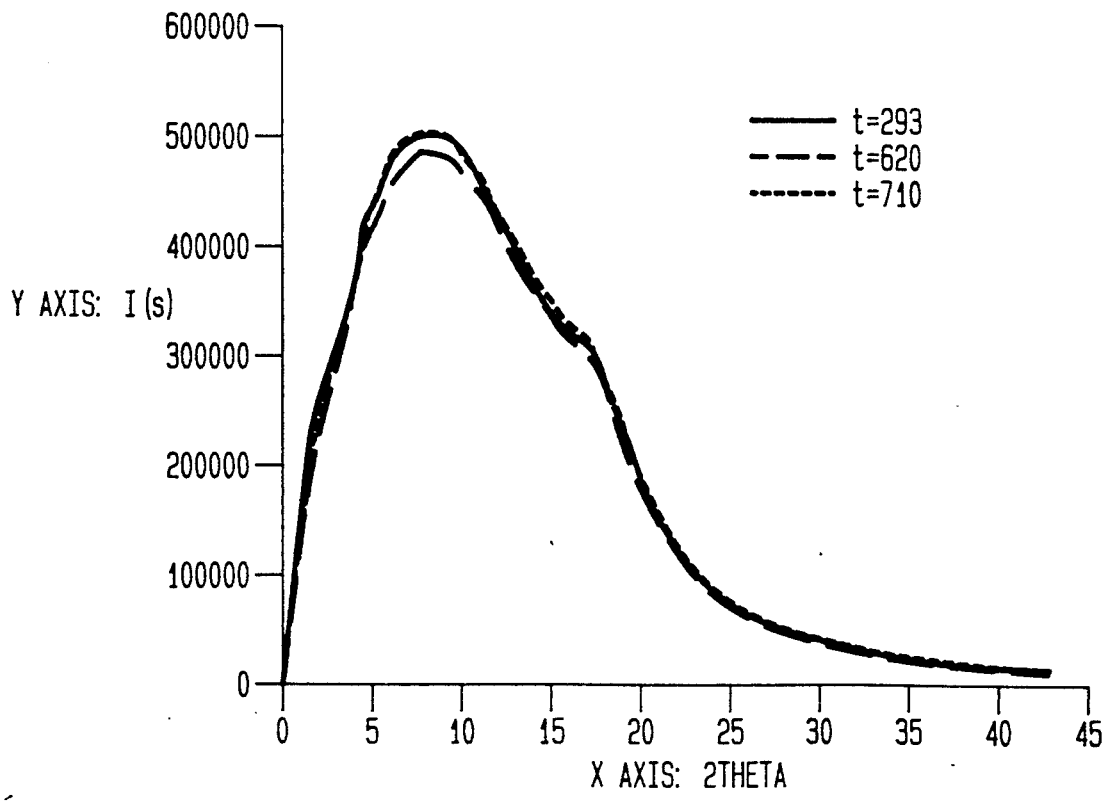
FIG. 14 shows x-ray scattering for a HIQ polymer.

Simulated X-ray scattering of random HIQ40 single chain is shown in FIG. 14. This has a broad peak at around 7° and a shoulder peak at about 17°. These peaks are there in the experimental X-ray scattering of HIQ40. However, these simulated spectra do not reproduce the scattering in HIQ which occurs between 17° and 30°. This indicates that the scattering at around 7° is due to a single chain while the scattering between the 17° and 30° is due to inter-chain spacings. The scattering due to single chain do not show any temperature effects. On the other hand, when HIQ40 is annealed above the glass transition temperature, the polymer becomes more crystalline as indicated by characteristic X-ray scattering. The peaks in the X-ray scattering, that changes upon heating are most likely due to the interchain spacings.

In brief, from modeling of X-ray scattering of single chain of HIQ we assign the low angle peak at 7° to intra molecular geometry while high angle scattering is due to inter-chain spacing.

Single Chain Modulus calculations for HIQ40

Single chain modulus is defined as the modulus of a polymer chain. Experimentally it is measured by measuring the meridional scattering on the fiber in the draw axis (orientational axis). A suitable meridional diffraction peak is used to study the strain along the fiber orientational direction as the function of stress. The point model of Blackwell has shown that peak at 2theta=43° in meridional scattering is sharp and invariant peak which has been proved by variety of liquid crystal copolyesters. If the peak is treated like a Bragg like diffraction, which correspond to an initial Bragg like d spacing then we have, Chain Modulus=Stress/Strain, or $$\Delta\sigma / \Delta\epsilon$$

$$\Delta\epsilon = \frac{\Delta d}{d}$$

We have Bragg's equation $$2d \sin \Theta = \lambda$$

differentiating above equation we have $$\frac{\delta\theta}{\delta d} = \frac{-\tan\theta}{d}$$

$$\therefore \Delta\epsilon = -\cot\theta \cdot \delta\theta$$

In the present calculations the shift in peak around 2theta=43° was monitored as a function of stress. It was found that once a force of 1000 pN was applied the chain was completely extended showing no further increase in the end to end distance. Therefore shift in the peak between 1000 and 10,000 pN was calculated. Stress is calculated as follows Stress (Gpa)=0.1×Force (pN) / Chain Area ($A^{02}$)

The chain can be pulled with a known amount of force. However the calculation of the single chain is tricky. We assume following assumption in the calculation of the chain area.

1. The density of HIQ40 single chain is 1.2 g/cm3.
2. Chain is completely extended.

In the extended conformation the end to end distance is same as third dimension of the chain. Since end to end distance data are available from the modeling, the chain area can be calculated as follows Density = Mass/volume = M/A.1

Molar mass for HIQ40 single chain is
138x.4 + 121x.3 + 110x.3 = 124.5

The end to end distance data are for 10 repeat units of HIQ40 decrease inter-chain interaction with increase in temperature.

Condensation polymers within a controlled sequence may be made by a variety of methods, for example any of the diacids, diols, hydroxyacids or para-aminophenol listed in Table 8 could be used in accordance with the present invention.

TABLE 8

TYPICAL MONOMERS FOR CONTROLLED SEQUENCE CONDENSATION POLYMERS

| DIACID | DIOL | HYDROXYACID | AMINOPHENOL |
|---|---|---|---|

Therefore M = 1245 g/mol

For l = 181Å

Therefore knowing the force, end to end distance (chain area) and shift in meridional peak, the modulus can be calculated. These values are shown below.

T = 298° K.

Modulus of random HIQ40 Single Chain = 102 GPa

Modulus of blocky HIQ40 Single Chain = 110 GPa

T = 620° K.

Modulus of blocky HIQ40 single chain = 76.4 GPa

T = 710° K.

Modulus of blocky HIQ40 single chain = 86.4 GPa

Figure 15:
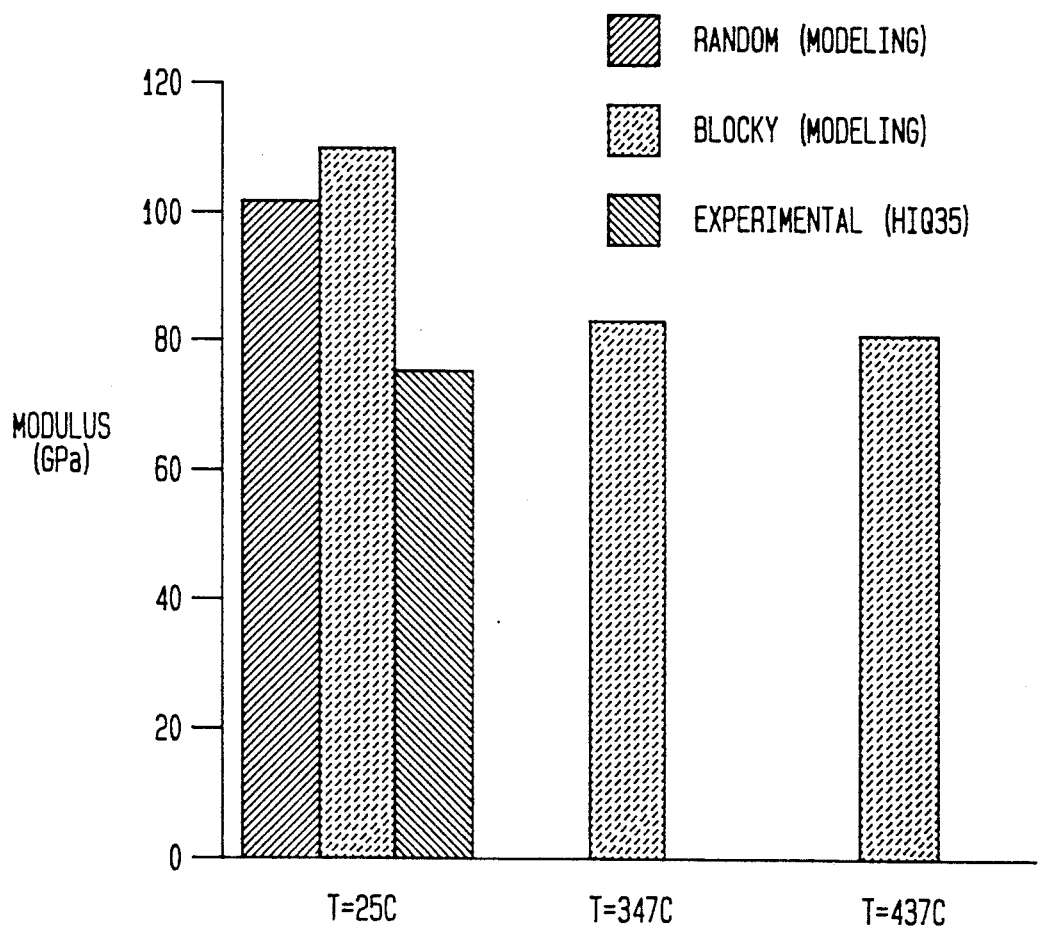
FIG. 15 illustrates differences in calculated modulus for various sequences.

These values are shown in FIG. 15. Experimentally the single chain modulus or X-ray modulus has been calculated for HIQ35 by measuring the meridional scattering of the fiber as a function of the stress. Although the exact values depends upon how the fibers were spun and whether they were heat treated or not. The measured values fall in the same range. Further modeling indicate the decrease in X-ray modulus of the single chain with increase in the temperature. This is interesting because with increase in temperature the X-ray modulus of the chain decreases, however it was not clear whether this decrease was due to inherent decrease in the modulus of single chain or if it was due to It is possible to make symmetrical three and five controlled sequence segments by swamping the stoichiometry and then purifying the materials. Acid terminated segments could be converted into the corresponding acid chlorides which could then be used to link together hydroxy terminated segments in solution at low temperatures. Using the above nomenclature, "A" designates a diacid, "B" a diol and "C" a hydroxy-acid.

Of the four symmetrical trimer segments, two are acids and two are hydroxyl. Considering isophthaloyl chloride also, there are three acids and two diols which could form six polymers.

| A to Cl-A-Cl | (1) |
|---|---|
| ABA to Cl-ABA-Cl | (2) |
| CAC to Cl-CAC-Cl | (3) |
| BAB | (4) |
| CBC | (5) |

(4) + (1) = ABAB = IQ (4) + (2) = ABABAB = IQ (4) + (3) = BABCAC = ABCACB = HIQ33 #1

(5) + (1) = CBCA = HIQ50 #1

(5) + (2) = CBCABA = ACBCAB = HIQ33 #2

(5) + (3) = CBCCAC = CCACBC = HIQ67

If the trimers are similarly converted to pentamers, the following are possible:

| | | | |
|---|---|---|---|
| ABABA to Cl-ABABA-Cl | (6) | BABAB | (9) |
| ACBCA to Cl-ACBCA-Cl | (7) | BCACB | (10) |
| CABAC to Cl-CABAC-Cl | (8) | CBABC | (11) |

(9)+(1)=BABABA=IQ (9)+(2)=BABABABA=IQ (9)+(3)=BABABCAC=ABCACBAB=HIQ25 #1

(9)+(6)=BABABABABA=IQ (9)+(7)=BABABACBCA=ACBCABABAB=-HIQ20 #1

(9)+(8)=BABABCABAC=ABCABACBAB=-HIQ20 #2

(10)+(1)=BCACBA=ABCACB=HIQ33 #1

(10)+(2)=BCACBABA=ABCACBAB=HIQ25 #1

(10)+(3)=BCACBCAC=HIQ50 #1

(10)+(6)=BCACBABABA=ABCACBABAB=-HIQ20 #3

(10)+(7)=BCACBACBCA=ACBACBCABC-=HIQ40 #1

(10)+(8)=BCACBCABAC=ACBCABACBC-=HIQ40 #2

(11)+(1)=CBABCA=ABCACB+HIQ33 #1

(11)+(2)=CBABCABA=ACBABCAB=HIQ25 #2

(11)+(3)=CBABCCAC=CCACCBAB=HIQ50 #2

(11)+(6)=CBABCABABA=ACBABCABAB=-HIQ20 #4

(11)+(7)=CBABCACBCA=ACBCACBABC-=HIQ40 #3

(11)+(8)=CBABCCABAC=ABACCBABCC-=HIQ40 #4

The invention is further understood by the following examples which show the controlled synthesis of various condensation polymers.

The above assumes that C can be added without making poly C. Using acid chlorides, C should react with Cl-A-Cl to form CAC. It will be more difficult to form and purify CBC or CBABC.

Blocks of C can presumably be formed as a mixture. Hopefully the short ones can be separated, purified, and identified by analytical techniques. Then they can be incorporated into polymers, the subject of another tome.

These building blocks can thus be used, at least in principle, to prepare many different HIQ compositions and sequence distributions.

EXAMPLE I

Preparation of di(p-carboxyphenyl)isophthalate

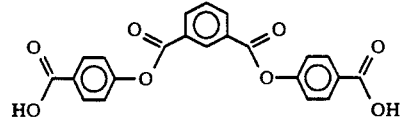

In a 10 liter three-necked Morton flask equipped with nitrogen inlet and outlet, thermometer, condenser and mechanical stirrer, were placed 179.6 grams (4.4 moles) of sodium hydroxide, 289.8 grams (2.1 m) of p-hydroxybenzoic acid, and 3 liters of distilled water. Isophthaloyl dichloride (203 grams, 1 m) was dissolved in 3 liters of methylene chloride. The acid chloride solution was added into the reaction flask with fast agitation. The resulting mixture was stirred at room temperature for one hour, and the solid disodium salt of the product was filtered, washed with water, and then acidified with a 10% solution of hydrochloric acid. The crude product was filtered, washed three times with distilled water, and twice with hot methanol, and then dried at 100° C. to obtain 300 grams of di(p-carboxyphenyl)isophthalate in 74% yield, with a melting point of 290°-300° C.

EXAMPLE II

Preparation of di(p-chlorocarbonylphenyl)isophthalate

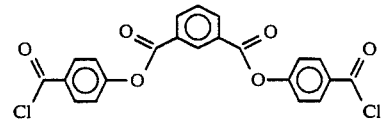

In a 2 liter three-necked flask equipped with nitrogen inlet and outlet, thermometer, condenser, safety trap, scrubber containing sodium hydroxide solution, and mechanical stirrer, were placed 100 grams (0.246 m) of di(p-carboxyphenyl)isophthalate, 1500 grams of thionyl chloride and 5 ml of N,N-dimethylformamide. The resulting mixture was reacted at about 80° C. for 24 hours, and cooled; a white solid was produced. The white solid was filtered, washed with hexanes, and dried. This white crude acid chloride was recrystallized from 5 liters of toluene, and dried at 100° C. under reduced pressure for 16 hours, to obtain 77 grams of di(p-chlorocarbonylphenyl)isophthalate in 71% yield: m.p. 204° C.; soluble in N-methyl-2-pyrrolidone, methylene chloride, dimethylsulfoxide, and hot toluene; insoluble in hexanes and cold toluene.

EXAMPLE III

Preparation of copolyester from di(p-chlorocarbonylphenyl)isophthalate and hydroquinone

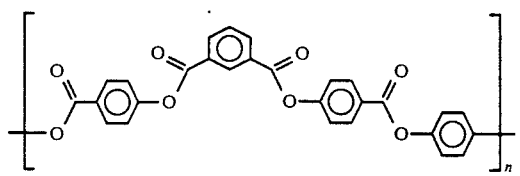

In a 12 liter three-necked Morton flask equipped with nitrogen inlet and outlet, thermometer, condenser and mechanical stirrer, were placed 22.15 grams (0.05 m) of di(p-chlorocarbonylphenyl)isophthalate, and 4.55 liters of methylene chloride. Hydroquinone (5.5 grams, 0.05 m) and 4.33 grams (0.105 m) of sodium hydroxide were dissolved in 330 ml of distilled water. This solution was added into the flask, along with an aqueous solution (50 ml) containing 0.7 grams of a 40% by weight benzyl-trimethyl-ammonium hydroxide solution in water. The resulting reaction mixture was stirred at 500 rpm at ambient temperature for 16 hours. Methylene chloride was then decanted. The solid polymer was filtered, washed twice with water, and air dried, washed twice with 400 ml of acetone, and then once more with water, and dried at 100° C. to obtain 17.13 grams of polymer with an inherent viscosity of 0.91 dl/g as determined at 0.1% concentration in HFIP/PFP 50/50 by volume at 25° C. The polymer exhibited a crystal to nematic transition at about 380° C., and a nematic to isotropic transition at about 480° C. Spectral analysis by NMR confirmed the structure of the polymer.

EXAMPLE IV

Preparation of copolyesteramide from di(p-chlorocarbonylphenyl)isophthalate and m-phenylenediamine

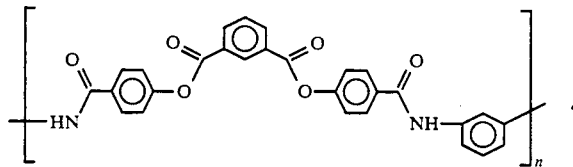

In a 2 liter three-necked resin flask equipped with nitrogen inlet and outlet, thermometer, condenser and mechanical stirrer, were placed 5.4 grams (0.05 m) of m-phenylenediamine, 4.3 grams of anhydrous lithium chloride, and 216 grams of N-methyl-2-pyrrolidone. The resulting mixture was cooled to −15° C. Di(p-chlorocarbonyl-phenyl)isophthalate (22.15 grams, 0.05 m) was added into the flask with fast agitation. The reaction temperature was allowed to rise to ambient temperature after the addition of the acid chloride. The resulting mixture was stirred for 5 hours at ambient temperature. The polymer was precipitated by adding the mixture to distilled water in a blender. The precipitated polyesteramide was filtered, washed with water, and dried at 100° C. and 0.1 Torr to obtain polyesteramide with a melting point of 405° C. and an inherent viscosity of 0.68 dl/g as determined at 0.1% concentration in HFIP/PFP 50/50 by volume at 25° C. The expected structure was confirmed by NMR spectral analysis.

EXAMPLE V

Preparation of copolyesteramide from di(p-chlorocarbonylphenyl)isophthalate and p-phenylenediamine

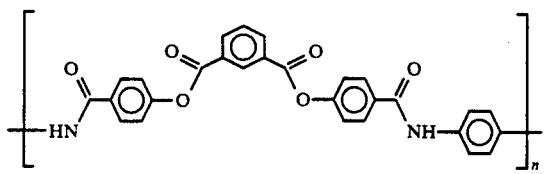

This copolyesteramide containing a p-phenyleneamide moiety was prepared in accordance with the procedure of Example IV, except that p-phenylenediamine was used instead of m-phenylenediamine, to obtain the copolyesteramide in 96.5% yield, with a melting point of 33° C. and the heat of fusion of 149 j/g as determined by DSC at a heating rate of 10° C. per minute under nitrogen.

EXAMPLE VI

Preparation of copolyesteramide from di(p-chlorocarbonylphenyl)isophthalate and aminophenol

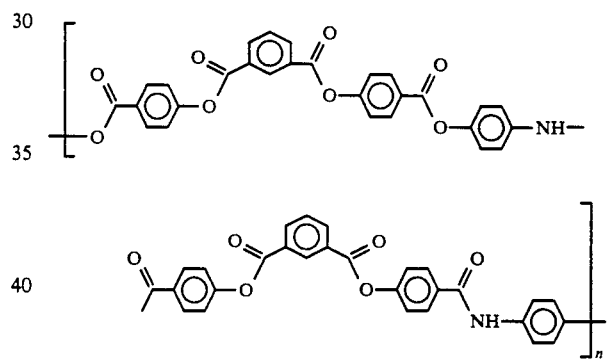

In a 2 liter three-necked resin flask equipped with nitrogen inlet and outlet, thermometer, condenser and mechanical stirrer, are placed 10.90 grams (0.1 m) of p-aminophenol, 4.3 grams of anhydrous lithium chloride, and 216 grams of N-methyl-2-pyrrolidone. The resulting mixture is cooled to −15° C. Di(p-chlorocarbonylphenyl)isophthalate (22.15 grams, 0.05 m) is added into the flask with fast agitation. The reaction temperature is allowed to rise to ambient temperature after the addition of the acid chloride. The resulting mixture is stirred for 5 hours at ambient temperature. The product aromatic esteramidediphenol is precipitated by adding the mixture to distilled water. The precipated esteramidediphenol is filtered, washed with water, and dried at 100° C. and 0.1 Torr to obtain esteramidediphenol of formula

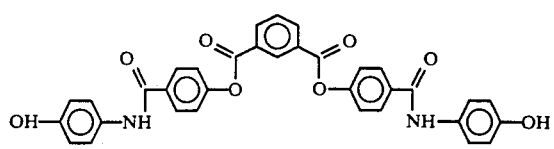

The copolyesteramide containing a p-phenyleneamideester moiety is prepared in accordance with the procedure of Example III, except that the esteramidediphenol is used instead of hydroquinone, to obtain the copolyesteramide.

EXAMPLE VII

Preparation of di(6-carboxy-2-naphthyl)isophthalate

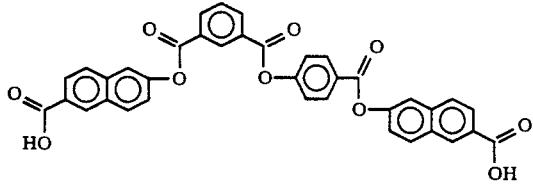

Di(6-carboxy-2-naphthyl)isophthalate was prepared in 78% yield in accordance with the procedure of Example I, except that 6-hydroxy-2-naphthoic acid was used instead of p-hydroxybenzoic acid. The compound melted at 340°–350° C.

EXAMPLE VIII

Preparation of di (6-chlorocarbonyl-2-naphthyl)isophthalate

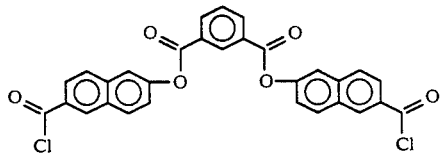

The acid chloride is prepared in accordance with the procedure of Example II, except that di(6-carboxy-2-naphthyl)isophthalate is used instead of di(p-carboxyphenyl)isophthalate. This compound can be used for the preparation of controlled sequenced polymers in accordance with Examples III to VI.

Instead of sequencing polymers by controlled synthesis, it may be possible to adjust polymer sequence by prolonged heating, especially above its melting point to make a random copolymer more or less blocky. This procedure is believed expedient with HIQ polymers as described hereinabove.

We claim:

1. A method of making a controlled sequence condensation polymer comprising the steps of:
   (a) selecting a first monomer wherein said first monomer is a diacid, diol, diamine, hydroxy-acid or aminophenol with the proviso that diacids include a structural unit from Group I, diols include a structural unit from Group II, hydroxy-acids include a structural unit from Group III and the aminophenol includes the structural unit of Group IV wherein:

Group I is

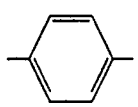

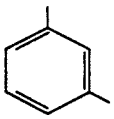

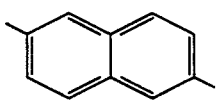

Group II is $(CH)_{2,4,3}$

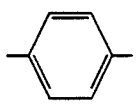

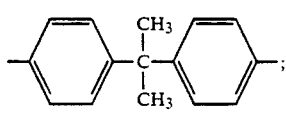

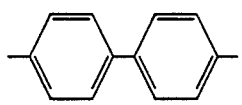

Group III is

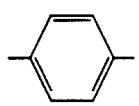

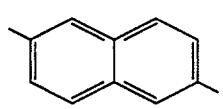

Group IV is

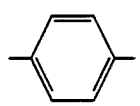

(b) selecting one or more comonomers capable of copolymerizing with said first monomer such that there are at least two unique first and second recurring units;
   (c) polymerizing by way of condensation polymerization said first monomer and said comonomers so that said first and second recurring units occur in non-random sequence in the polymer so made.

2. The method according to claim 1, further comprising the step of forming an oligomer prior to the step of polymerizing said monomers.

3. The method according to claim 2, wherein said oligomer is an acid chloride oligomer.

4. The method according to claim 1, wherein said method includes the step of forming at least one acid chloride.

5. The method according to claim 1 wherein the polymer is a polyester.

6. The method according to claim 5, wherein the polymer contains the residue of hydroxybenzoic acid.

7. The method according to claim 1, wherein the polymer contains the residue of 2,6-hydroxynaphthoic acid.

8. The process according to claim 1, wherein said polymer consists essentially of the residue of hydroxybenzoic acid and 2,6-hydroxynaphthoic acid.

9. The process according to claim 1, wherein the polymer is a polyamide.

10. The process according to claim 1, wherein the polymer is a polyester-amide.

11. A method of making a controlled sequence condensation polymer comprising the steps of selecting at least two monomers of differing structure capable of forming at least a first and second unique recurring unit, determining at least one sequence dependent property of a polymer including said two monomers, and non-randomly forming a polymer including said first and second monomers to optimize said sequence-dependent property.

12. The method according to claim 11, further comprising the step of forming an oligomer prior to the step of polymerizing said monomers.

13. The method according to claim 12, wherein said oligomer is an acid chloride oligomer.

14. The method according to claim 11, where said method includes the step of forming at least one acid chloride.

15. The method according to claim 11, wherein the polymer is a polyester.

16. The method according to claim 15, wherein the polymer contains the residue of hydroxybenzoic acid.

17. The method according to claim 11, wherein the polymer contains the residue of 2,6-hydroxynaphthoic acid.

18. The process according to claim 11, wherein said polymer consists essentially of the residue of hydroxybenzoic acid and 2,6-hydroxynaphthoic acid.

19. The process according to claim 11, wherein the polymer is a polyamide.

20. The process according to claim 11, wherein the polymer is a polyester-amide.

* * * * *